(12) United States Patent
Shimada (10) Patent No.: US 8,587,966 B2
(45) Date of Patent: *Nov. 19, 2013

(54) SWITCHING POWER SUPPLY DEVICE

(75) Inventor: Masaaki Shimada, Saitama (JP)

(73) Assignee: Sanken Electric Co., Ltd., Saitama-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,360

(22) Filed: Sep. 14, 2012

(65) Prior Publication Data

US 2013/0003426 A1    Jan. 3, 2013

Related U.S. Application Data (63) Continuation of application No. 12/888,160, filed on Sep. 22, 2010, now Pat. No. 8,305,775.

(30) Foreign Application Priority Data

Sep. 30, 2009  (JP) ................................ 2009-228289

(51) Int. Cl.
*H02M 3/335* (2006.01)
(52) U.S. Cl.
USPC ..................... 363/21.02; 363/21.18
(58) Field of Classification Search
USPC ................. 363/20, 21.01, 21.04, 21.1, 21.12, 363/21.18, 49

See application file for complete search history.

(56) References Cited

U.S. PATENT DOCUMENTS

| | | | |
|---|---|---|---|
| 5,528,483 A | 6/1996 | Mohandes | |
| 6,542,387 B2 | 4/2003 | Tsuge | |
| 7,099,164 B2 * | 8/2006 | Zhu et al. | 363/21.12 |
| 7,746,615 B2 * | 6/2010 | Zhu et al. | 361/97 |
| 8,194,421 B2 | 6/2012 | Djenguerian et al. | |
| 8,199,533 B2 | 6/2012 | Shimada | |
| 8,305,775 B2 | 11/2012 | Shimada | |
| 2002/0145888 A1 | 10/2002 | Yoshinaga et al. | |
| 2005/0207187 A1 | 9/2005 | Adragna et al. | |
| 2006/0119281 A1 | 6/2006 | Nishikawa et al. | |
| 2010/0008106 A1 | 1/2010 | Kawabe et al. | |
| 2011/0096574 A1 | 4/2011 | Huang | |

FOREIGN PATENT DOCUMENTS

JP          2002315330 A       10/2002

* cited by examiner

*Primary Examiner* — Adolf Berhane
(74) *Attorney, Agent, or Firm* — Wilmer Cutler Pickering Hale and Dorr LLP (57) ABSTRACT

During a soft start period at the time of startup, a PWM control is carried out. After the soft start period ends, the PWM control is converted into a frequency control, so that stress of a switching element is suppressed and the audible oscillation frequency is removed. As a result, it is possible to obtain a switching power supply device having high power conversion efficiency.

6 Claims, 7 Drawing Sheets

SWITCHING POWER SUPPLY DEVICE

CROSS-REFERENCE TO RELATED APPLICATIONS

This application is a continuation application of U.S. Ser. No. 12/888,160, filed on Sep. 22, 2010, which claims priority from Japanese Patent Application No. 2009-228289 filed on Sep. 30, 2009. The entirety of these applications are incorporated herein by reference.

BACKGROUND OF THE INVENTION

1. Field of the Invention

The present invention relates to a switching power supply that is used for an electronic device and the like, and more particularly, to a switching power supply device capable of obtaining a stable startup operation of a power source.

2. Description of the Related Art

There has been proposed a switching power supply device that controls an on/off operation of a switching element to control an output voltage is used for an OA device, a living device and the like. Recently, from standpoints of environments and energy saving, improvement of efficiency is required for the switching power supply device. In order to suppress loss of a switching element in the switching power supply device, a voltage resonance or current resonance is used. A control circuit that controls the resonance operation is typically comprised of an integrated circuit of one chip.

Figure 6:
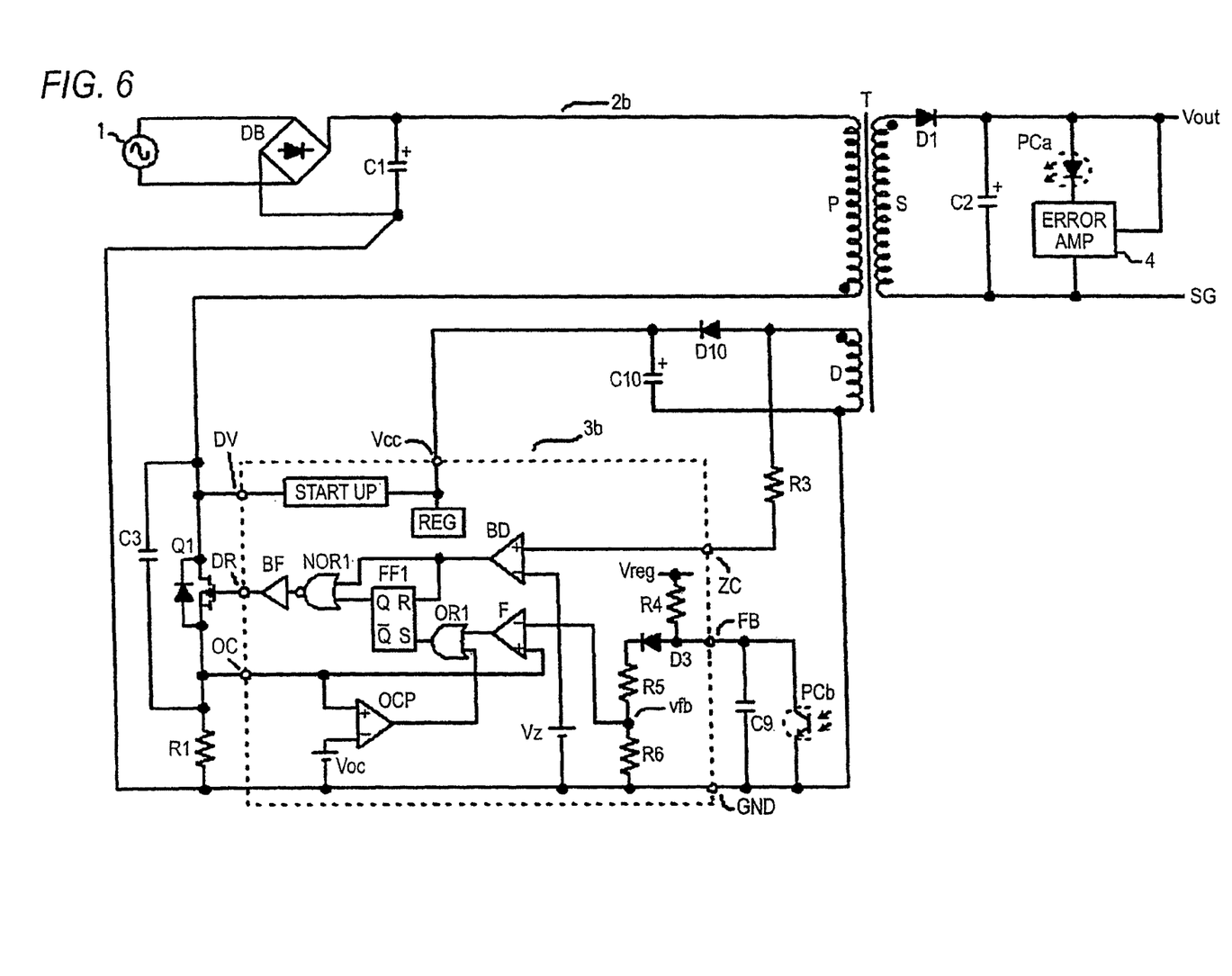
FIG. 6 is a circuit diagram of a related-art switching power supply device.

FIG. 6 is a circuit diagram showing a structure of a related-art switching power supply device 2b. The switching power supply device 2b is a pseudo resonance-type switching power supply device. The switching power supply device 2b has an alternating current power source 1, a bridge rectifier DB, a smoothing condenser C1, a transformer T, a switching element Q1, a current detection resistance R1, a rectification diode D1, an output condenser C2, an error amplifier 4, photo-couplers PCa, PCb, a condenser C9, a condenser C10 for an auxiliary power source, a diode D10 and a controller 3b for controlling the switching element Q1, as shown in FIG. 6.

The controller 3b has, as external input terminals, a startup terminal (DV terminal) that is connected to a drain terminal of the switching element Q1, an input terminal (Vcc terminal) of a power source, a feedback signal input terminal (FB terminal), an over-current protection terminal (OC terminal), a voltage detection terminal (ZC terminal) of an auxiliary coil D of the transformer T, a DR terminal for outputting a control signal to the switching element Q1 and a ground terminal (GND terminal) of the controller 3b.

The transformer T has a primary coil P, a secondary coil S and an auxiliary coil D and transfers the energy to a secondary side circuit. In addition, the switching element Q1 is connected to the primary coil P of the transformer T.

The error amplifier 4 is connected between Vout and SG and controls current flowing in the photo-coupler PCa in accordance with a difference between the output voltage Vout and an internal reference voltage. The photo-coupler PCa is comprised of a light emitting diode and feeds back an error for a reference voltage to a primary side. In addition, the photo-coupler PCb is a photo transistor that operates in accordance with the light from the light emitting diode of the photo-coupler PCa and has a collector connected to the FB terminal of the controller 3b and an emitter grounded to the GND terminal.

An auxiliary power source for the controller 3b is structured in such a way that the diode D10 and the condenser C10 are connected to the auxiliary coil D, rectifies/smoothes voltage induced to the auxiliary coil D of the transformer T and charges the voltage in the condenser C10 of the auxiliary power supply to supply power to the Vcc terminal of the controller 3b.

The voltage that is induced to the secondary coil S during the off period of the switching element Q1 is rectified/smoothed by the rectification diode D1 and the output condenser C2 and then outputted to a load from Vout, as a secondary side output voltage.

In addition, as shown in FIG. 6, the controller 3b includes a startup circuit StartUp, an internal power source Reg, logic circuits NOR1, OR1, comparators BD, F, OCP, a flip flop circuit FF1, resistances R4, R5, R6, a diode D3, reference voltages Vz, Voc and a drive circuit BF.

The internal power source Reg starts up the controller 3b based on power supplied from the Vcc terminal and supplies power required for the whole operation of the controller 3b. In addition, the startup circuit StartUp supplies power to the internal power source terminal Vcc till a predetermined voltage in inputting the power and stops the supply after oscillation of the controller 3b starts, so that it is switched to an auxiliary power source obtained by rectifying the voltage from the auxiliary coil D of the transformer T.

The voltage Vreg of the internal power source Reg generates a feedback voltage from the secondary side to the FB terminal by the photo-coupler PCb and the condenser C9 which are provided outside of the controller 3b and are connected to the FB terminal.

The voltage Vreg of the internal power source Reg is connected to the ground GND via the resistance R4, the diode D3, the resistance R5 and the resistance R6 and the FB terminal is connected to the resistance R4 and an anode of the diode D3.

In addition, an inverting terminal (minus (−) input terminal) of the comparator F is connected with the resistance R5 and the resistance R6 and is applied with a voltage that is proportional to the FB terminal voltage.

The OC terminal is connected to a source terminal of the switching element Q1 and the resistance R1, is applied with a voltage depending on the current flowing in the switching element Q1 and outputs a voltage signal to a non-inverting terminal (plus (+) input terminal) of the comparator F and a non-inverting terminal of the comparator OCP.

The comparator F outputs a H signal when a voltage signal depending on the current flowing in the switching element Q1, which is outputted from the OC terminal of the controller 3b, exceeds a voltage Vfb of an input terminal. Thereby, when the voltage value of the OC terminal voltage signal exceeds the voltage value vfb depending on the feedback amount from the secondary side appearing in the FB terminal, the comparator F inputs a signal of an H level to an S terminal of the flip flop circuit FF1 through the OR circuit OR1 and turns off the switching element Q1 through the logic circuit NOR1 and the drive circuit BF, thereby controlling the output voltage of the secondary side at a constant value.

When the voltage signal outputted from the OC terminal exceeds a reference voltage value voc, the current flowing in the switching element Q1 becomes an over-current. Thus, the comparator OCP outputs an H signal.

When the H signal is inputted by any one of the comparator OCP and the comparator F, the logic circuit OR1 outputs the H signal to the S terminal of the flip flop circuit FF1.

A non-inverting terminal of the comparator BD is connected to the ZC terminal, and the ZC terminal is connected to the auxiliary coil D of the transformer T through the resistance R3. An inverting terminal of the comparator BD is connected to a reference voltage Vz and an output terminal of the comparator BD is connected to an R terminal of the flip flop circuit FF1 and one input terminal of the logic circuit NOR1.

The comparator BD compares a fly-back voltage of the auxiliary coil D with the reference voltage Vz, completes the energy discharge of the accumulated energy of the transformer T to the secondary side through the secondary coil S and detects that a polarity of the coil voltage is inverted. At the time at which the coil voltage of the auxiliary coil D is lowered below the reference voltage Vz, the output terminal of the comparator BD outputs an L signal to the R terminal of the flip flop circuit FF1 and the logic circuit NOR1 and switches the switching element Q1 to an on state from an off state through the drive circuit BF.

The flip flop circuit FF1 outputs a control signal from a Q terminal, based on the signal inputted to the S terminal and the signal inputted to the R terminal. The Q terminal of the flip flop circuit FF1 is connected to one input terminal of the logic circuit NOR1. In addition, an output of the logic circuit NOR1 is connected to the drive circuit BF. The switching element Q1 is on-off controlled in accordance with an output of the logic circuit NOR1.

In the followings, an operation of the related-art switching power supply device 2b will be described. First, the sinusoidal voltage outputted from the alternating current power source 1 is rectified in the bridge rectifier DB, which then passes through the smoothing condenser C1 and is outputted to the drain terminal of the switching element Q1 through the primary coil P of the transformer T.

The switching element Q1 is turned on/off by the controller 3b and each coil of the transformer T is supplied with the energy, so that the current flows in the secondary coil S and the auxiliary coil D.

The current flowing in the secondary coil S is rectified/smoothed to become direct current power by the diode D1 and the output condenser C2, which is then outputted to an external load from Vout.

As the on/off operation of the switching element Q1 is repeated, the output voltage of Vout is gradually increased. When the output voltage reaches a reference voltage set in the error amplifier 4, the current flowing in the photo diode of the photo-coupler PCa is increased. Thus, since the current flowing in the photo transistor of the photo-coupler PCb is increased, the condenser C9 is discharged and the voltage of the FB terminal is lowered. Thereby, as described above, the controller 3b controls the switching element Q1 through the comparator F, the logic circuit OR1, the flip flop circuit FF1, the logic circuit NOR1 and the buffer circuit BF, thereby stabilizing the output voltage of Vout.

The current flowing in the auxiliary coil D rectified/smoothed by the diode D10 and the condenser C10, so that it is used as an auxiliary power source of the controller 3b and supplies power to the Vcc terminal. As described above, when the Vcc terminal once reaches the startup voltage, the power supply from the startup circuit StartUp is cut off. Accordingly, the power supply to the Vcc terminal after the startup is carried out by the auxiliary power source circuit including the auxiliary coil D, the diode D10 and the condenser C10. Since a polarity of the auxiliary coil D is the same as that of the secondary coil S, the voltage of Vcc is proportional to the output voltage of Vout.

Herein, regarding the switching operation of the switching element Q1 from an off state to an on state, a ringing waveform of the transformer is used which is generated after the power discharge of the secondary coil S of the transformer T. In other words, the switching element Q1 is turned on to a bottom of the ringing waveform of the auxiliary coil D of the transformer.

Further, in order to prevent a malfunction, measures may be taken in which some time is provided so as to prevent the switching element Q1 from being again turned on by the ringing just after the turn off or off time is prolonged so as to reduce a switching loss under light load, thereby making a low switching frequency. For example, such technology is disclosed in JP-A-2002-315330.

An oscillation frequency of the above-described pseudo resonance-type ringing choke converter is often set to be about 20 kHz in order to improve efficiency and avoid audible frequency within a range of the input voltage or load conditions, even though the oscillation frequency is varied depending on the input voltage and load conditions.

Figure 7:
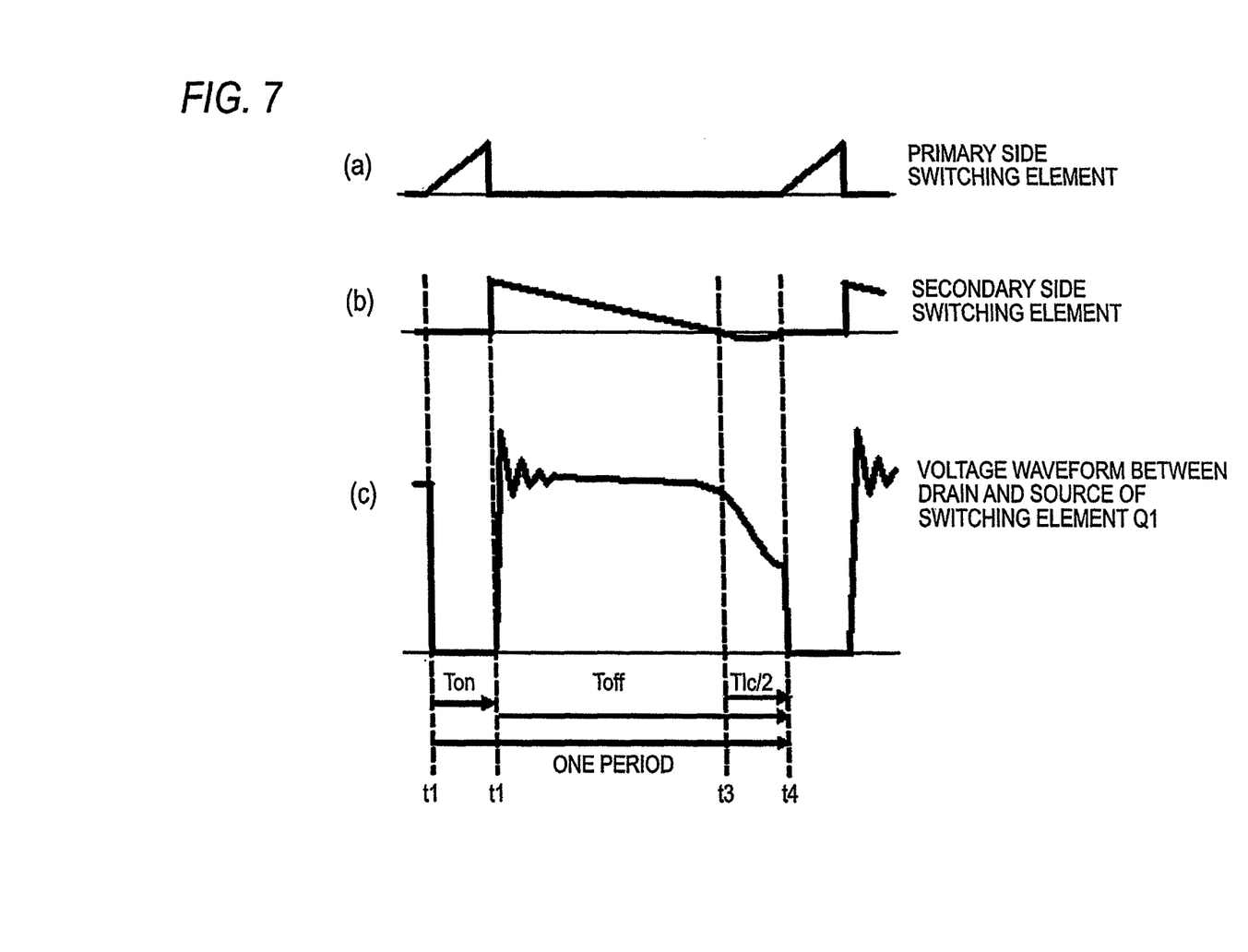
FIG. 7 shows a part of an operation waveform of the related-art switching power supply device.

FIG. 7 shows a part of an operation waveform of a related-art pseudo resonance-type ringing choke converter. In FIG. 7, (a) shows a waveform of current in the switching element Q1, (b) shows a waveform of current flowing in the secondary side diode D1 and (c) shows a waveform between a drain and a source of the switching element Q1.

A time period of t1 to t2 indicates an on state of the switching element Q1. A time period of t2 to t4 indicates an off state of the switching element Q1, wherein a time period of t2 to t3 indicates a period during which the accumulated energy of the transformer T is discharged from the secondary coil S and the current flows in the secondary side diode D1. A time period of t3 to t4 is a half period during which the transformer T is ringing.

Here, a period of the self-excited oscillation of the pseudo resonance-type ringing choke converter is expressed by a following equation (4).

Ton: switching on time
Toff: switching off time
Lp: inductance value of primary coil P
Vin: input voltage
Vo: output voltage
lppk: peak value of primary coil current
lspk: peak value of secondary coil current
Vf: forward voltage of secondary side rectification diode
Cqr: capacity of voltage resonance condenser
Cmos: capacity between main terminals of switching element $$Ton = (Lp/Vin) \times lppk \quad (1)$$

$$Toff = (Ls \times lspk)/(Vo \times Vf) \quad (2)$$

$$Tlc = 2 \times \Pi \times \sqrt{(Lp \times (Cqr + Cmos))} \quad (3)$$

$$\text{Period of ringing choke converter} = Ton + Toff + Tlc/2 \quad (4)$$

From the equation (1), it can be seen that when an input voltage is low, the time Ton is lengthened. In addition, from the equation (2), it can be seen that when an output voltage is low, the time Toff is lengthened.

Accordingly, the power supply starts up at a state in which the input voltage is low and the output voltage starts at 0 volt. As a result, the period is lengthened. In addition, a switching frequency of the pseudo resonance-type ringing choke converter that performs a self-excited oscillation is lowered to the audible frequency at the time of startup of the power supply. This is an intrinsic problem that cannot be solved by the means for setting an off time and lengthening the off time, as disclosed in the related art.

Further, in living devices, a noise that is harsh to the ear is generated at the time of startup of the power supply.

SUMMARY OF THE INVENTION

An object of the invention is to provide a switching power supply device capable of realizing a stable power supply startup operation, considering the above problems.

According to one aspect of the invention, there is provided a switching power supply device comprising: a transformer; a switching element connected to a primary coil of the transformer; and a controller that controls an on/off operation of the switching element, wherein the switching power supply device is configured to: control the controller to execute the on/off operation of the switching element when voltage is inputted to a primary side of the transformer so as to induce a voltage to a secondary coil of the transformer, rectify/smoothen the voltage induced to the secondary coil of the transformer, and output the rectified/smoothened voltage to a load; at a time of startup, execute the on/off operation of the switching element by using a PWM control; and after the startup, switch the PWM control to a frequency control and execute the on/off operation of the switching element by using the frequency control so as to stably control the voltage outputted to the load.

According to another aspect of the invention, in the switching power supply device, wherein the switch of the PWM control to the frequency control is carried out at an end timing of a soft start period of the switching power supply device.

According to still another aspect of the invention, in the switching power supply device, wherein an on time or off time in the on/off operation of the switching element by using the PWM control is fixed.

According to still another aspect of the invention, in the switching power supply device, wherein the switching power supply device limits a current flowing in the switching element by stepwise increasing the current during the soft start period.

According to still another aspect of the invention, the switching power supply device further comprises a switch that switches from the PWM control to the frequency control at an end timing of a soft start period of the switching power supply device.

According to the aspects of the invention, it is possible to provide a switching power supply device capable of realizing a stable power supply startup operation without lowering the power supply efficiency.

DETAILED DESCRIPTION OF THE PREFERRED EMBODIMENTS

Hereinafter, exemplary embodiments of the invention will be described with reference to the drawings.

First Exemplary Embodiment

Figure 1:
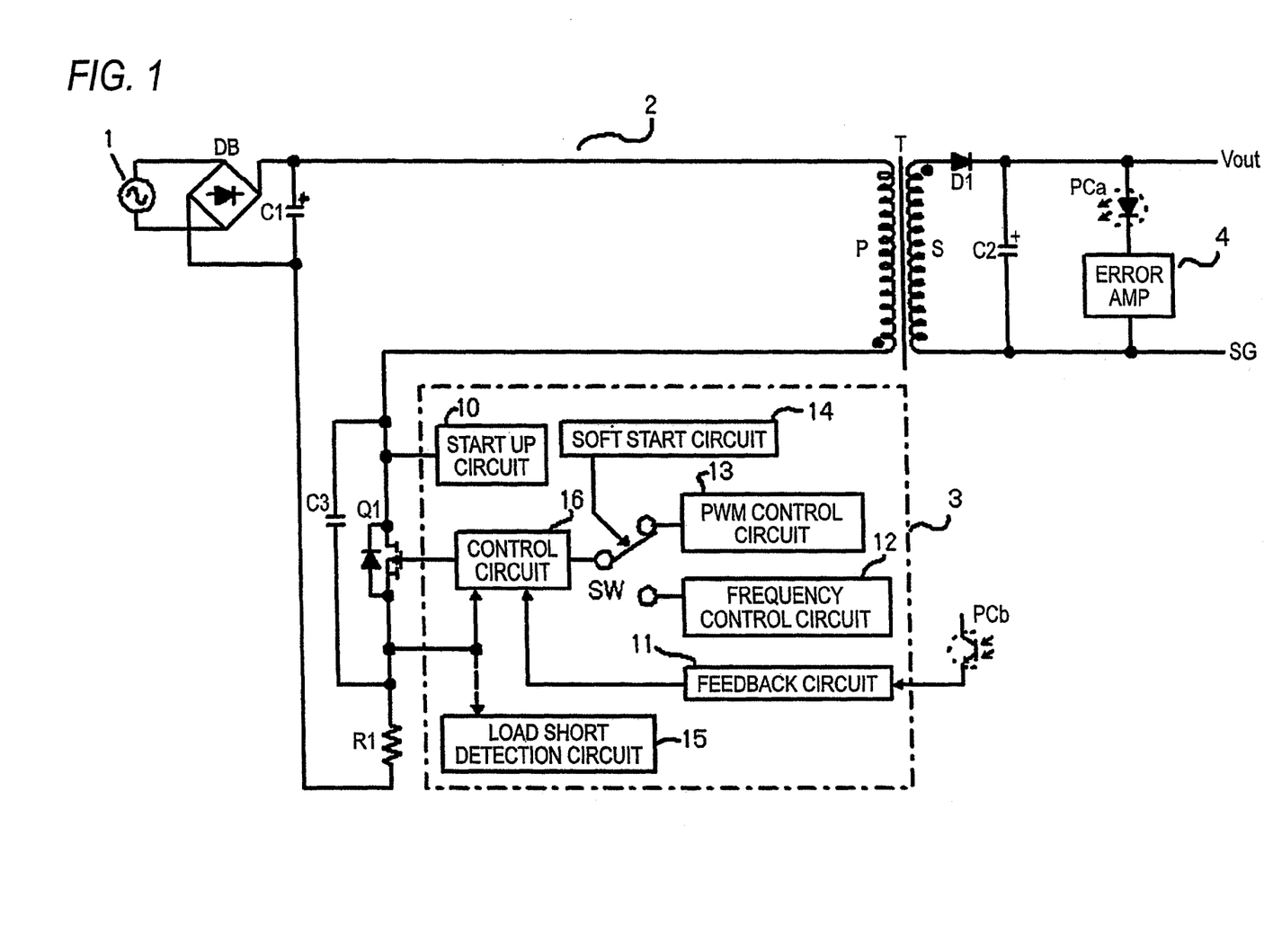
FIG. 1 is a schematic view showing a structure of a switching power supply device according to an exemplary embodiment of the invention.

FIG. 1 is a schematic view showing a structure of a switching power supply device according to the invention.

A power conversion circuit of a switching power supply device 2 shown in FIG. 1 is a pseudo resonance-type ringing choke converter.

An alternating current voltage of an alternating current power source 1 is rectified/smoothed to a direct current voltage by a bridge rectifier DB and a condenser C1. The DC voltage accumulates electron energy by an on operation of a switching element Q1 through a primary coil P of a transformer T. A voltage, which is induced to a secondary coil S of the transformer T when the switching element Q1 is turned off, is rectified/smoothed by a diode D1 and a condenser C2, thereby supplying power to an output Vout.

Herein, a control circuit 3 of the invention has a startup circuit StartUp 10, a control circuit 16, a feedback 11 that converts an error signal from a secondary side output voltage, a soft start circuit 14 that carries out a soft start at the time of startup of the power supply, a switch SW, a frequency control 12, a PWM control 13 and a load short detection 15.

Figure 2:
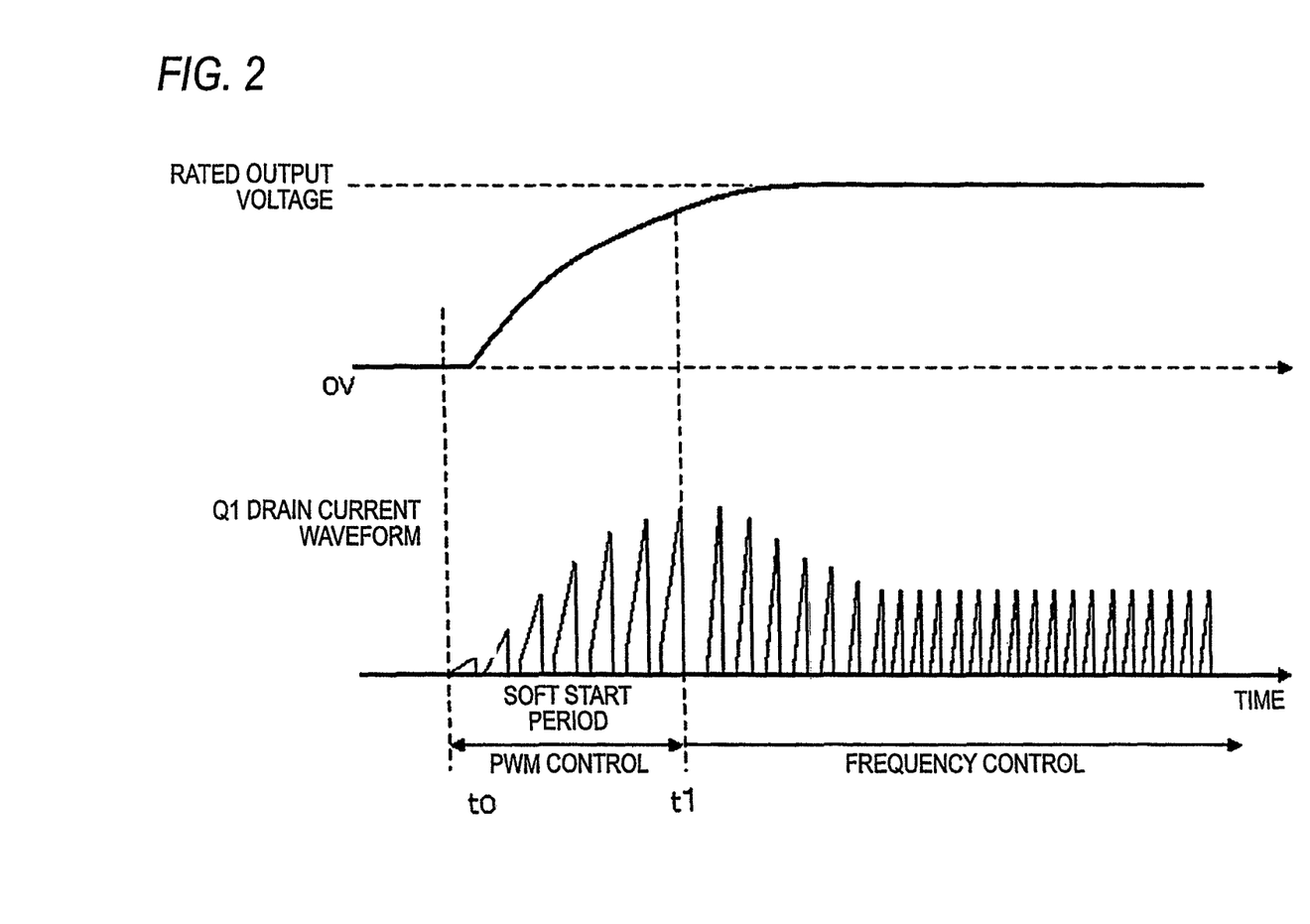
FIG. 2 illustrates a startup operation of a switching power supply device according to the exemplary embodiment of the invention.

FIG. 2 illustrates a startup operation of the switching power supply device according to the invention.

When the power supply starts up, a power voltage is supplied to the control circuit 3 from the startup circuit StartUp 10. Then, during a time period of t0 to t1, the switching power supply device (ringing choke converter) is controlled by the PWM control with a soft start function, so that power is supplied to the load. After the time t1, the control circuit is promptly switched to the frequency control by the switch SW after the soft start time period of the control circuit ends.

In addition, drain current flowing in the switching element Q1 is inputted as a signal to the load short detection 15 via a resistance R1. The load short detection 15 detects whether there is an overload from a value of the drain current. When the load short detection detects an overload, it shifts the switching element Q1 to the off state from the on state at the time of detection.

In the followings, exemplary embodiments of the invention will be described with reference to the drawings.

Figure 3:
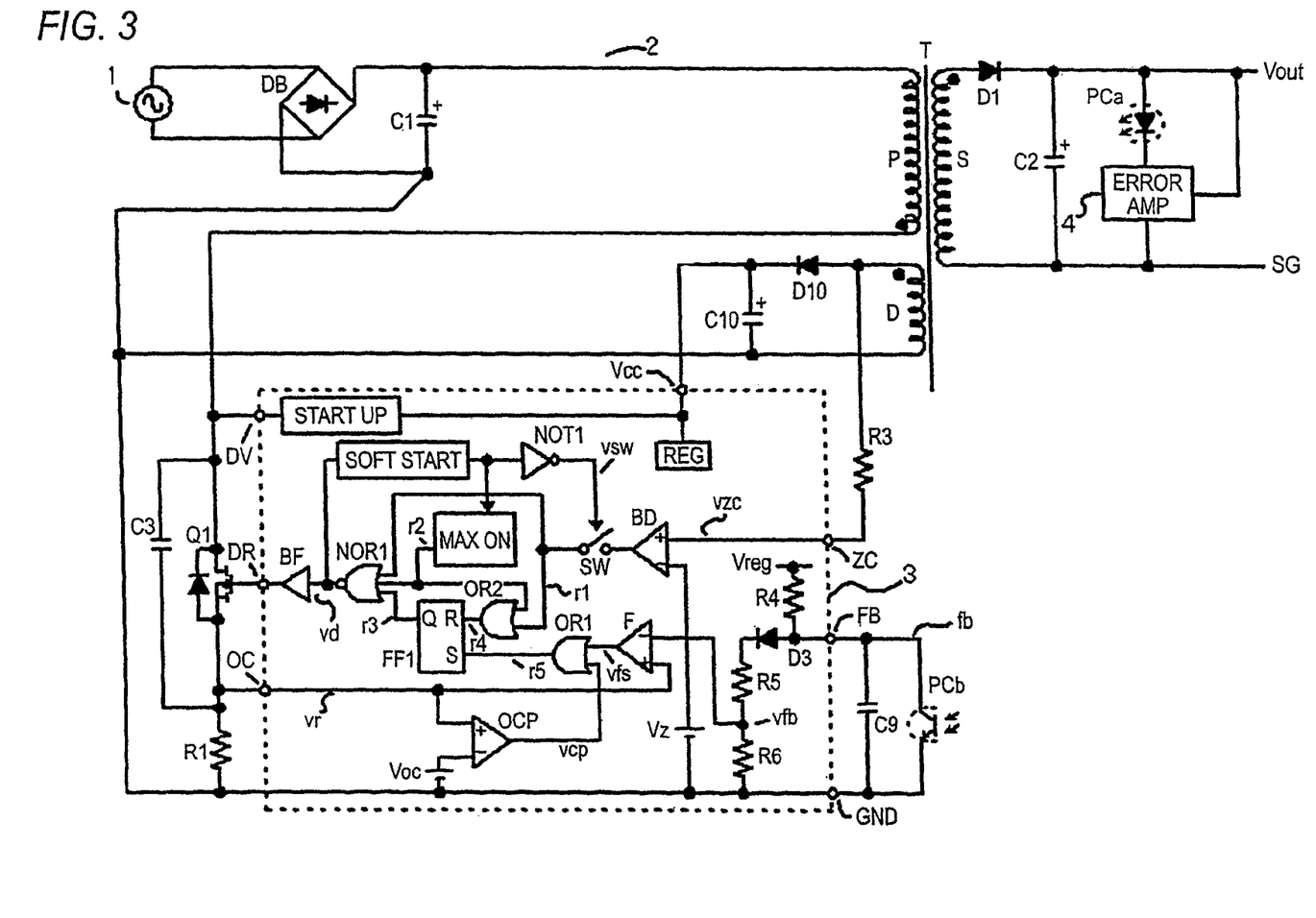
FIG. 3 is a view showing a controller of a switching power supply device according to a first exemplary embodiment of the invention.

FIG. 3 is a view showing a switching power supply device 2 according to a first exemplary embodiment of the invention, in which a detailed structure of a controller 3 of the switching power supply device 2 according to the first exemplary embodiment is shown.

Figure 5:
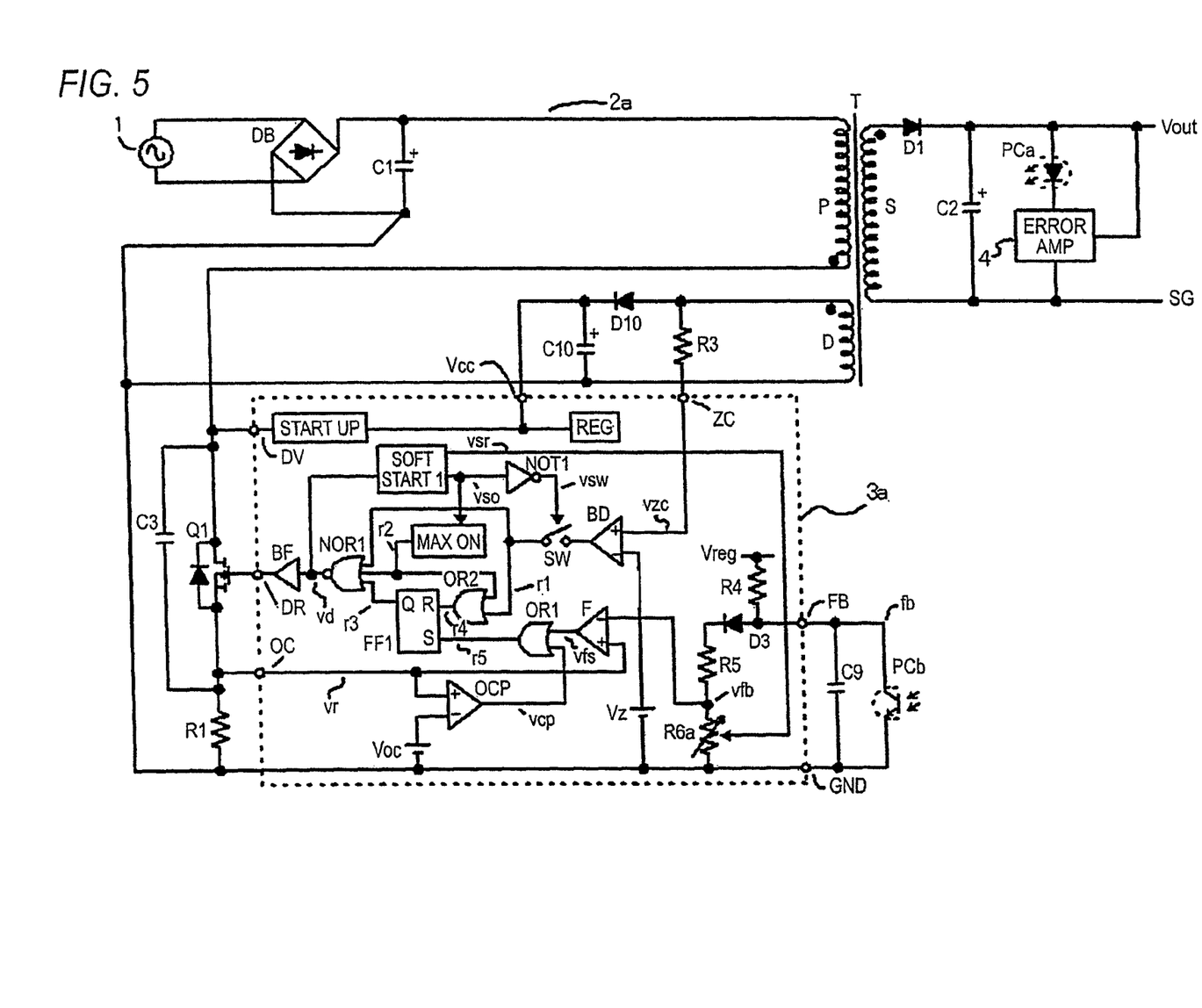
FIG. 5 is a view showing a controller of a switching power supply device according to a second exemplary embodiment of the invention.

Incidentally, in FIGS. 3 and 5 showing the respective exemplary embodiments, the constitutional elements same or equivalent as or to those in FIG. 6 are indicated with the same reference numerals and the repeated description will be omitted.

As shown in FIG. 3, the switching power supply device 2 has an alternating current power source 1, a bridge rectifier DB, a smoothing condenser C1, a transformer T, a switching element Q1, a resistance R1 for detecting drain current of the switching element Q1, a voltage resonance condenser C3, a rectification diode D1 of a secondary side, an output smoothing condenser C2, an error amplifier 4, photo-couplers PCa, PCb, a condenser C9, a diode D10 constituting an auxiliary power source, an electrolytic condenser C10 and a control circuit 3 for controlling the switching element Q1.

The alternating current power source 1 is connected to the bridge rectifier DB and the AC voltage of the AC power source 1 is converted into a direct current voltage in the bridge rectifier DB. A ripple component included in the DC voltage outputted from the bridge rectifier DB is smoothed by the condenser C1 connected between both output terminals, i.e., positive and negative terminals of the bridge rectifier DB, so that the DC voltage becomes a DC voltage having a little ripple.

The switching power supply device 2 includes the transformer T having a primary coil P, a secondary coil S and an auxiliary coil D. The positive output terminal of the bridge rectifier DB is connected to one terminal of the primary coil P of the transformer T, and the other terminal of the primary coil P is connected to a drain terminal of the MOSFET Q1 that is the switching element. In addition, a source terminal of the MOSFET Q1 is connected to the negative output terminal of the bridge rectifier DB through the resistance R1 (hereinafter, a line connected to the negative output terminal of the bridge rectifier DB is referred to as a ground potential GND.

The condenser C10 is connected to a cathode terminal of the diode D10 and the Vcc terminal of the control circuit 2, an anode terminal of the diode D10 is connected to one terminal of the auxiliary coil D of the transformer T and one terminal of a resistance R3, and the other terminal of the resistance R3 is connected to a ZC terminal of the control circuit 3. One terminal of the condenser C9, a collector of the photo transistor of the photo-coupler PCb and a FB terminal of the control circuit 3 are connected. The other terminal of the condenser C9, an emitter terminal of the photo transistor of the photo-coupler PCb, the other terminal of the auxiliary coil D, the GND terminal of the control circuit 3 and the ground potential GND are connected. In addition, the drain terminal of the MOSFET Q1 that is the switching element is connected with one terminal of the voltage resonance condenser C3 and a DV terminal of the control circuit 3, and the source terminal of the MOSFET Q1 is connected with the other terminal of the voltage resonance condenser C3 and an OC terminal of the control circuit 3.

One terminal of the secondary coil S of the transformer T is connected with an anode terminal of the diode D1. A cathode terminal of the diode D1, a positive terminal of the condenser C2, an anode terminal of the photo diode of the photo-coupler PCa, a voltage detection terminal of the error amplifier 4 and the output terminal Vcc for load are connected. The anode terminal of the photo diode of the photo-coupler PCa and a control terminal of the error amplifier 4 are connected. The other terminal of the secondary coil S of the transformer T, a negative terminal of the condenser C2, a negative terminal of the error amplifier 4 and a SG output terminal for load are connected.

In the followings, an internal structure of the control circuit 3 will be specifically described.

The control circuit 3 of FIG. 3 has a startup circuit StartUp, an internal power source Reg, logic circuits NOR1, OR1, OR2, NOT1, comparators BD, F, OCP, a flip flop circuit FF1, resistances R4, R5, R6, a diode D3, reference voltages Vz, Voc, a drive circuit BF, a soft start circuit SoftStart, an oscillator MaxON and a switch SW.

The oscillator MaxON is connected to a second input terminal of the logic circuit NOR1 and a first input terminal of the logic circuit OR2.

A first input terminal of the logic circuit NOR1 and a second input terminal of the logic circuit OR2 are connected to one terminal of the switch SW. A third input terminal of the logic circuit NOR1 and an output Q of the flip flop circuit FF1 are connected, a reset terminal R of the flip flop circuit FF1 is connected to an output of the logic circuit OR2 and a set terminal S of the flip flop circuit FF1 is connected to an output of the logic circuit OR1. An output of the logic circuit NOR1 is connected to an input terminal of a buffer circuit BF and an input terminal of the soft start circuit SoftStart, and an output of the soft start circuit SoftStart is connected to an input terminal of the logic circuit NOT1 and an on/off terminal of the oscillator MaxON. An output of the logic circuit NOT1 is connected to an on/off control terminal of the switch SW.

A first input terminal of the logic circuit OR1 is connected with an output of the comparator F. A second input terminal of the logic circuit OR1 is connected with an output of the comparator OCP. Non-inverting terminals of the comparator OCP and the comparator F are connected to each other and also connected to the source terminal of the switching element Q1, one terminal of the resistance R1 and the other terminal of the voltage resonance condenser C3 through the control circuit terminal OC. An inverting terminal of the comparator OCP is connected with a reference voltage Voc. An inverting terminal of the comparator F is connected with the other end of the resistance R5 and one terminal of the resistance R6.

One end of the resistance R5 is connected with a cathode of the diode D3 and an anode of the diode D3 is connected with the other terminal of the resistance R4 and the FB terminal of the control circuit 3. One terminal of the resistance R4 is connected with a power source voltage Vreg of the internal power source Reg. The FB terminal of the control circuit 3 is connected with the collector terminal of the photo-coupler PCb and one terminal of the condenser C9, like the related art.

An output of the comparator BD is connected to the other terminal of the switch SW. An inverting input terminal of the comparator BD is connected with the reference voltage Vz, and a non-inverting input terminal of the comparator BD is connected with the other terminal of the resistance R3 through the ZC terminal of the control circuit 3. One terminal of the resistance R3 is connected to a terminal of dot polarity of the auxiliary coil D of the transformer T. Here, the dot polarity of the auxiliary coil D is the same as polarity of a power supply side of the secondary coil S of the transformer T.

Negative terminals of the respective reference voltages Voc, Vz and the other terminal of the resistance R6 are connected with the GND terminal of the controller 3. The GND terminal of the controller 3 is connected with the other terminal of the resistance R1, the condenser C9, the emitter terminal of the transistor of the photo-coupler PCb, the negative terminal of the smoothing condenser C1 and the negative terminal of the bridge rectifier DB.

An output of the buffer circuit BF is connected to a gate terminal of the switching element Q1 through a DR terminal of the control circuit 3.

In the followings, a new structure of the controller 3 of FIG. 3 will be described.

The soft start circuit SoftStart times when the power supply starts up, transmits an output signal of an L level when it reaches predetermined time and turns on the switch SW through the logic circuit NOT1 and stops an oscillation operation of the oscillator MaxOn. For example, the soft start circuit SoftStart is comprised of a timer circuit and a counter circuit that counts a predetermined number of times of output signal pulses of the logic circuit NOR1 and then outputs an output signal pulse.

The oscillator MaxOn determines an oscillation frequency at the time of PWM control and limits a maximum ON width of the switching element. An output of the oscillator MaxOn is on-off controlled by the soft start circuit SoftStart and keeps a low level under off state. The switch SW is a switch that selects any one of the PWM control by the oscillator MaxOn and the frequency control by the output signal of the comparator BD regarding the control of the control circuit 3 and is on-off controlled by the soft start circuit SoftStart.

Figure 4:
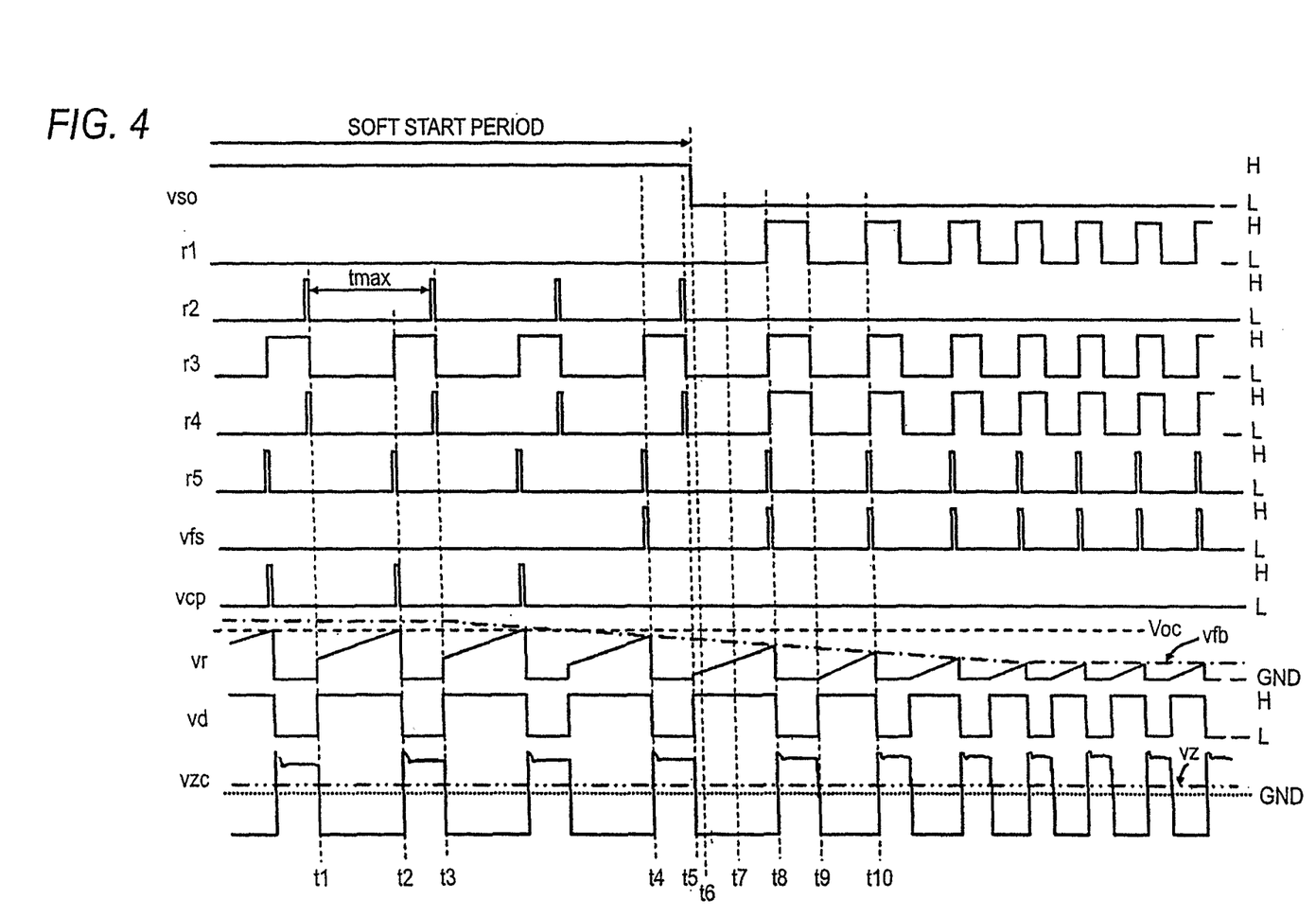
FIG. 4 is a timing chart illustrating an operation of a switching power supply device according to the first exemplary embodiment of the invention.

FIG. 4 is a timing chart illustrating an operation of the switching power supply device according to the first exemplary embodiment of the invention.

In the followings, a switching operation to the frequency control from the PWM control at the time of startup will be described with reference to the internal structure of the control circuit 3 shown in FIG. 3 and the timing chart shown in FIG. 4.

During the soft start period up to time t0 of FIG. 4, an output signal vso of the soft start circuit StartUp becomes an H level, the switch SW is under off state, and the controller 3 is controlled using the PWM control by the oscillator MaxOn. Accordingly, the first input terminal r1 of the logic circuit NOR1 is an L level. In addition, the oscillator MaxOn outputs a signal of a pulse waveform having a period tmax, like the time period of t1 to t3.

Here, at time t1, the output signal vso of H level from the oscillator MaxOn is inputted into one input terminal of the logic circuit OR2. The output r2 of the logic circuit OR2 becomes an H level and is inputted to the reset terminal of the flip flop circuit, which is then reset. Since all the signals r1 to r3 become the L level, an output signal vd of the logic circuit NOR1 is inverted to an H level. The signal vd enables the switching element Q1 ON through the buffer circuit BF, so that the excited current of the primary coil P of the transformer T flows to the resistance R1 and a voltage yr is generated in the resistance R1. When the voltage yr reaches the level of the reference voltage Voc at time t2, the output signal of the comparator OCP is inverted to the H level from the L level, which sets the flip flop circuit FF1 to be a set state through the logic circuit OR1. When the flip flop circuit FF1 is set to be a set state, the Q output of the flip flop circuit FF1 is inverted and the signal r3 becomes the H level, thereby enabling the switching element Q1 OFF through the logic circuit NOR1 and the buffer circuit BF.

Then, at time t3, the output signal of H level from the oscillator MaxOn is inputted to the one input terminal of the logic circuit OR2, so that the above-described operations are repeated.

Here, as the operations are repeated, the power is supplied to a secondary side load (not shown) from the transformer T, so that the output voltage Vout is increased. When the output voltage approaches a rated voltage, the current is enabled to flow through the photo-couplers PCa, PCb from the error amplifier 4 of the secondary side during the time period of t3 to t8, so that the FB terminal voltage fb is gradually lowered. Thereby, the inverting terminal voltage vfb of the comparator F is also proportionally lowered. When the inverting terminal voltage is lowered below the voltage vr of the resistance R1 at time t4, the output vfs of the comparator F is inverted to the H level, thereby setting the flip flop circuit FF1 to be a set state through the logic circuit OR1. When the flip flop circuit FF1 is set to be a set state, the Q output of the flip flop circuit FF1 is inverted and the signal r3 becomes the H level, thereby enabling the switching element Q1 OFF through the logic circuit NOR1 and the buffer circuit BF. At this time, since the voltage vr does not reach the level of the reference voltage Voc, the output signal vcp of the comparator OCP keeps the L level state.

At time t5, the output signal vso of H level from the oscillator MaxOn is inputted to the one input terminal of the logic circuit OR2, so that the above operations are repeated.

When the soft start period ends at time t6, the output signal vso of the soft start circuit SoftStart becomes the L level, the switch SW becomes the on state through the logic circuit NOT1, the oscillator MaxOn is switched to the off state and the signal r2 keeps the L level state.

Since the signal r1 is connected with the output signal of the comparator BD and the non-inverting input terminal of the comparator BD is inputted with a voltage lower than the reference voltage Vz, the output of the comparator BD is an L level, the signal r1 keeps the L level and the signals r4, r3 are not also changed. Therefore, the on state of the switching element Q1 at time t7 is not changed.

Then, at time t8 at which the inverting terminal voltage vfb of the comparator F is lowered below the voltage vr of the resistance R1, the output vfs of the comparator F is inverted to the H level, thereby setting the flip flop circuit FF1 to be a set state through the logic circuit OR1. When the flip flop circuit FF1 is set to be a set state, the Q output of the flip flop circuit FF1 is inverted, the signal r3 becomes the H level and the switching element Q1 is thus off through the logic circuit NOR1 and the buffer circuit BF. At this time, since the voltage vr does not reach the level of the reference voltage Voc, the output signal vcp of the comparator OCP keeps the L level state.

In addition, at time t8, since the non-inverting input terminal of the comparator BD is inputted with the voltage higher than the reference voltage Vz, the signal r1 is inverted to the H level, the output signal of the logic circuit NOR1 is kept at the L level and the H level is inputted to the reset terminal of the flip flop circuit FF1 through the logic circuit OR2, so that the flip flop circuit FF1 becomes a reset state. Here, the Q output of the flip flop circuit FF1 is inverted to the L level. However, since the first input signal r1 of the logic circuit NOR1 is the H level, the output signal vd of the logic circuit NOR1 keeps the L level.

The power that is accumulated as the excited current flows in the primary coil P of the transformer T over the time period of t5 to t8 is completely discharged to the secondary side load over the time period of t8 to t9 and causes ringing in each coil voltage of the transformer T, so that the voltage polarity of the auxiliary coil D is instantaneously inverted and the voltage is lowered below the reference voltage vz. Here, since the output of the comparator BD is inverted to the L level, the signal r1 becomes the L level, thereby switching the switching element Q1 to the on state from the off state through the logic circuit NOR1 and the buffer circuit BF.

Since the inverting terminal voltage vfb of the comparator F is lowered below the voltage vr of the resistance R1 at time t10, the switching element Q1 is switched to the off state from the on state, like at time t8, and the same operation as that of from time t8 is repeated.

Second Exemplary Embodiment

FIG. 5 shows a second exemplary embodiment of the invention. The circuit structure of the second exemplary embodiment of the invention shown in FIG. 5 is the same as that of the first exemplary embodiment of the invention shown in FIG. 3, except that the soft start circuit SoftStart and the resistance R6 of the control circuit 3 are replaced with a soft start circuit SoftStart1 to output two output signals and a resistance R6a, and an output terminal of the soft start circuit SoftStart1 is connected to a terminal changing a resistance value of the resistance R6a.

During the soft start period, which is also a period during which the output voltage of the secondary side reaches a normal voltage, a resistance value of the resistance R6a is gradually changed to a large value from a small value, so that the switching element Q1 is switched while the current flowing in the switching elements Q1 is limited. As a result, it is possible to prevent the excessive current from flowing in the switching element Q1 at the time of startup.

The present invention is not limited to the above exemplary embodiments and can be additionally changed. For example, in the switching power supply device according to the invention, although the switching element Q1 is controlled by using the PWM control, the control may be also performed by fixing the OFF or ON period or stepwise changing the resistance value of the resistance R6a of the second exemplary embodiment to stepwise change the current flowing in the switching element. In order to set a predetermined time of the soft start period, a time constant circuit with a charge voltage by the condenser and a predetermined reference voltage may be used in addition to the counter circuit that counts the gate signal vd of the switching element Q1.

According to the above exemplary embodiments, it is possible to obtain a switching power supply device having high power conversion efficiency in which the PWM control is carried out at the time of startup, contrary to the startup operation by the related-art frequency control, and thus the stress of the switching element is suppressed and the audible oscillation frequency is removed.

While the present invention has been described with reference to the specific exemplary embodiments, the exemplary embodiments have been provided as examples of the present invention and the present invention is not limited thereto.

The present invention can be used as a control manner capable of realizing a stable power supply startup operation without decreasing the power efficiency.

What is claimed is:

1. A power supply control device, comprising:
   a controller,
   wherein the controller outputs a switching signal adapted to control a switch connected to a primary coil of a transformer, and
   wherein, during a startup period, the controller outputs the switching signal based on a PWM control; and
   wherein, after the startup period, the controller changes from outputting the switching signal based on the PWM control to outputting the switching signal based on a frequency control.

2. The power supply control device according to claim 1, wherein the controller changes from outputting the switching signal based on the PWM control to outputting the switching signal based on the frequency control at an end timing of a soft start period.

3. The power supply control device according to claim 1, wherein the switching signal is adapted to switch the switch between an on state and an off state,
   wherein, when the switching signal is based on the PWM control, the switching signal is adapted to control the on time of the on state or the off time of the off state to be fixed.

4. The power supply control device according to claim 2, wherein the controller is adapted to output the switching signal to limit a current flowing in the switch by stepwise increasing the current during the soft start period.

5. The power supply control device according to claim 1, further comprising:
   a PWM control circuit that outputs a PWM control signal;
   a frequency control circuit that outputs a frequency control signal;
   a control switch that switches from outputting the PWM control signal to the frequency control signal at an end of a soft start period.

6. A switching power supply device, comprising:
   the power supply control device according to claim 1;
   the switch that receives the switching signal from the controller; and
   the transformer having the primary coil connected to the switch.

* * * * *